Figure 1:
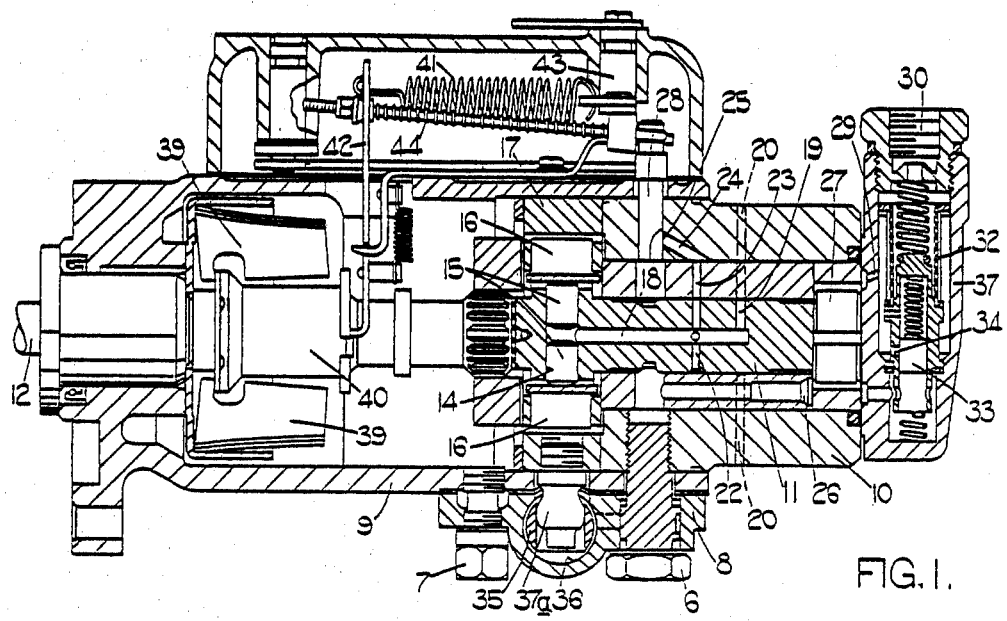

United States Patent

Mowbray et al.

[11] 4,393,846
[45] Jul. 19, 1983

[54] FUEL PUMPING APPARATUS

[75] Inventors: Dorian F. Mowbray, Burnham; Ivor Fenne, Greenford; Eric J. Cavanagh, Surbiton, all of England

[73] Assignee: Lucas Industries Limited, Birmingham, England

[21] Appl. No.: 230,269

[22] Filed: Jan. 30, 1981

[30] Foreign Application Priority Data

Feb. 15, 1980 [GB] United Kingdom ............... 8005266

[51] Int. Cl.³ ......................................... F02M 59/20
[52] U.S. Cl. ................................... 123/502; 123/357; 123/501
[58] Field of Search .................. 123/502, 501, 357

[56] References Cited

U.S. PATENT DOCUMENTS

| | | | |
|---|---|---|---|
| 3,815,564 | 6/1974 | Suda et al. | 123/502 |
| 3,934,430 | 1/1976 | Fuso | 123/502 |
| 4,019,478 | 4/1977 | Hobo et al. | 123/502 |
| 4,033,310 | 7/1977 | Nicolls | 123/502 |
| 4,080,109 | 3/1978 | Green | 123/502 |
| 4,265,200 | 5/1981 | Wessel et al. | 123/501 |

FOREIGN PATENT DOCUMENTS 2052647A 1/1981 United Kingdom ............... 123/502

Primary Examiner—Ira S. Lazarus
Assistant Examiner—Magdalen Moy

[57] ABSTRACT

A fuel pumping apparatus includes an injection pump to which fuel is supplied through an adjustable throttle and which includes a fluid pressure operable device for controlling the timing of delivery of fuel. In order to accurately control the timing in accordance with the speed and the amount of fuel supplied to the engine a transducer is provided to sense the throttle position and a further transducer to measure the pressure upstream of the throttle. The signals from these transducers together with an engine speed signal are supplied to a circuit which computes or on the basis of stored information, provides a fuel quantity signal. The fuel quantity signal is supplied to a further circuit together with a speed signal which produces a desired timing signal. This signal is utilized to control the pressure applied to the device.

4 Claims, 12 Drawing Figures

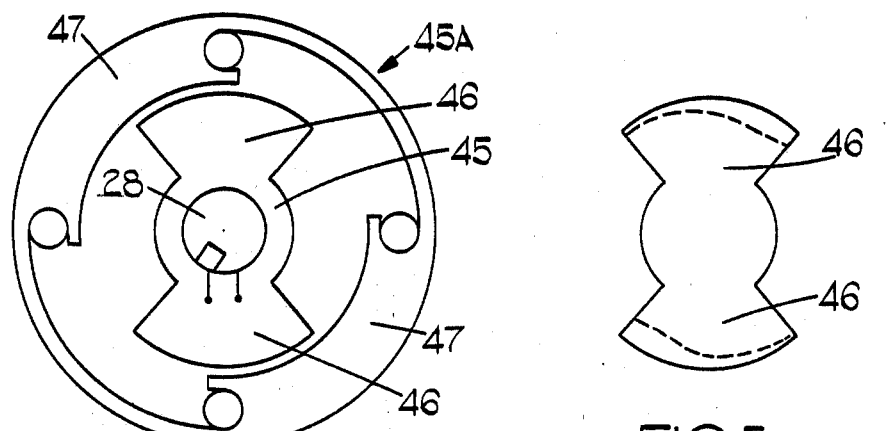
FIG. 4.
FIG. 5.
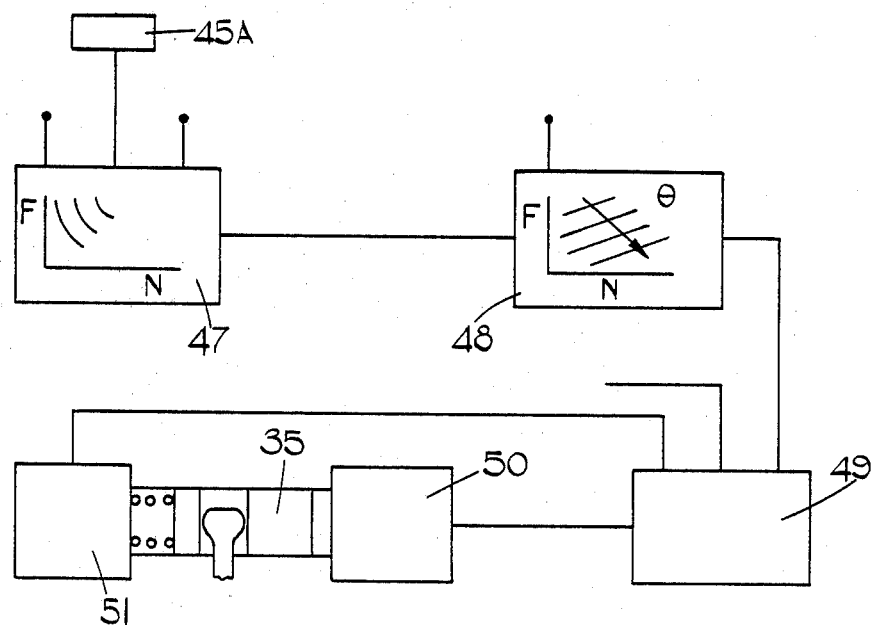
FIG. 6.

FUEL PUMPING APPARATUS

This invention relates to a fuel pumping apparatus for supplying fuel to an internal combustion engine and of the kind comprising an injection pump operable in use in timed relationship with an associated engine, fluid pressure operable means for adjusting the timing of delivery of fuel by the apparatus, a low pressure fuel supply pump for supplying fuel to the injection pump, and an adjustable throttle for varying the quantity of fuel supplied to the injection pump.

Such pumps are well known in the art, and it is the usual practice for the fluid pressure operable means to be supplied with fuel under pressure from the outlet of the supply pump. The pressure is controlled so that it varies in accordance with the speed of rotation of the apparatus. In this manner the timing of delivery of fuel is varied with speed. It is known to modify the pressure applied to said means in accordance with the amount of fuel supplied to the injection pump in order to improve the efficiency of operation of the associated engine.

Recent legislation and the increase in the cost of fuel require that the control of the timing of delivery of fuel should be more closely controlled than is possible with the arrangements described above.

One of the difficulties is obtaining a reliable indication of the amount of fuel supplied to the engine. Such an indication can be obtained by providing a measuring device such for example as a shuttle movable in a cylinder. This arrangement requires the provision of valves which can switch the fuel flow to and from each end of the cylinder and hence is expensive to produce.

The object of the invention is to provide an apparatus of the kind specified in a simple and convenient form.

According to the invention an apparatus of the kind specified comprises a transducer associated with the throttle valve for providing a first signal indicative of the effective flow area of the throttle valve throughout the range of movement thereof, an electrical circuit which receives said first signal, a second signal indicative of the speed of operation of the apparatus and a third signal indicative of the fuel pressure upstream of the metering valve and from which is determined a fourth signal representing the amount of fuel supplied to the injection pump, and means responsive to at least said second and fourth signals for providing a fifth signal to vary the timing of delivery of fuel by the apparatus.

Figure 2:
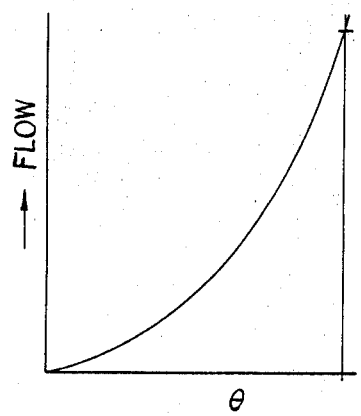
Figure 3:
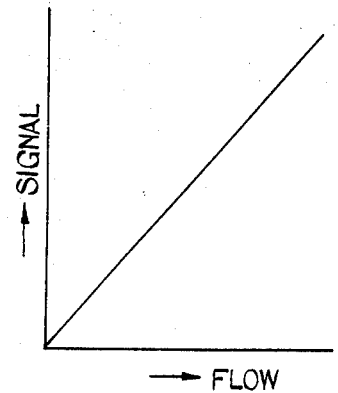
Figure 7:
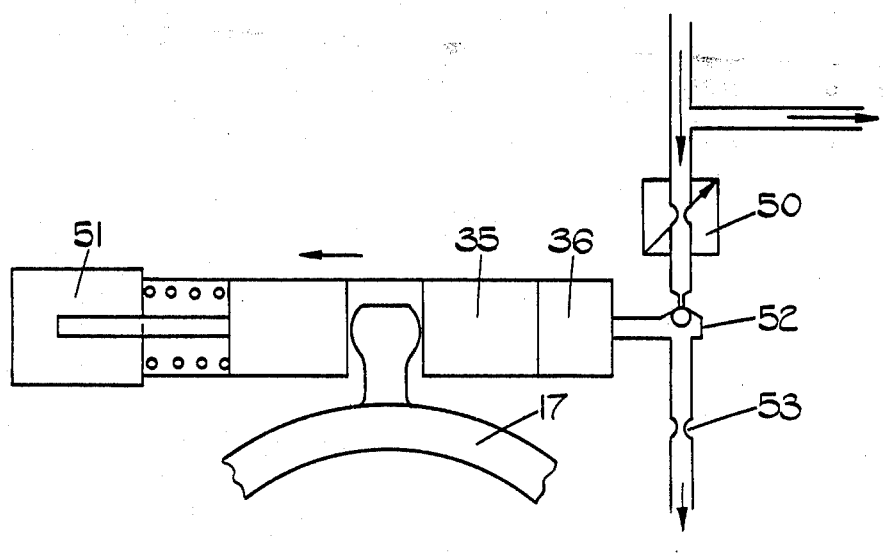
Figure 8:
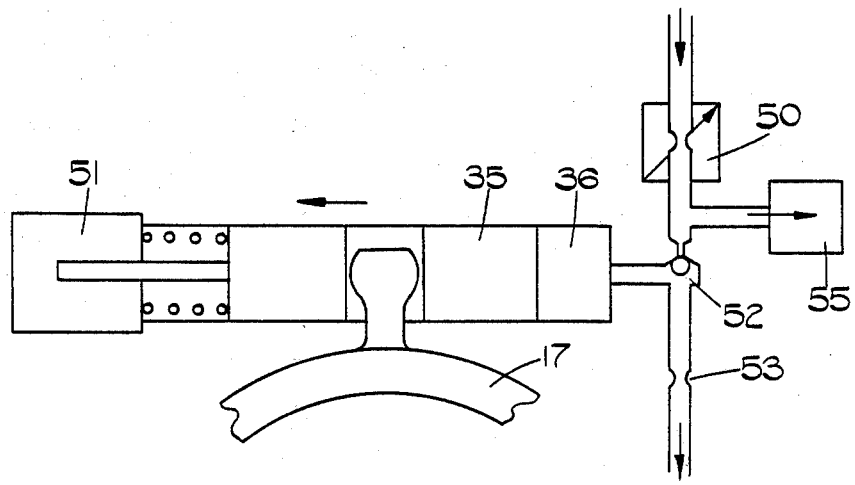
Figure 9:
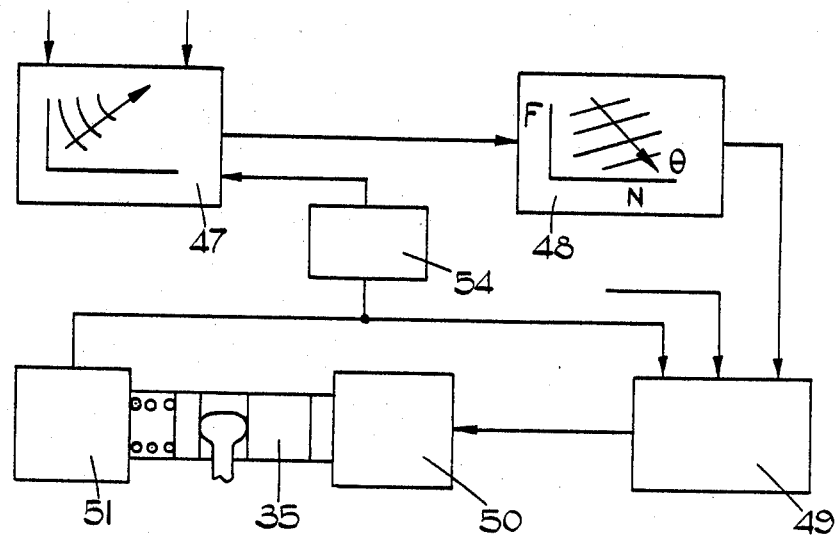
Figure 10:
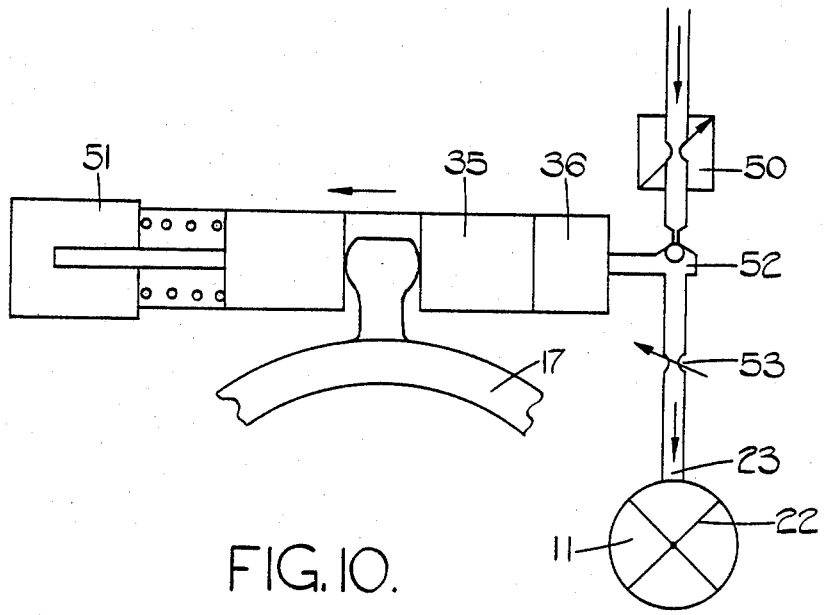
Figure 11:
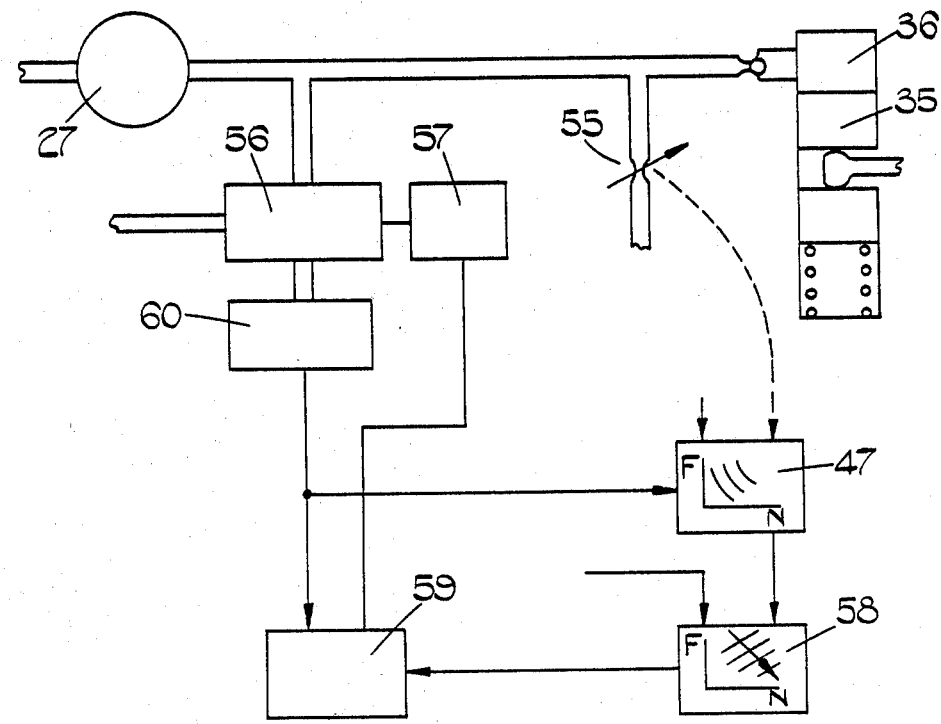
Figure 12:
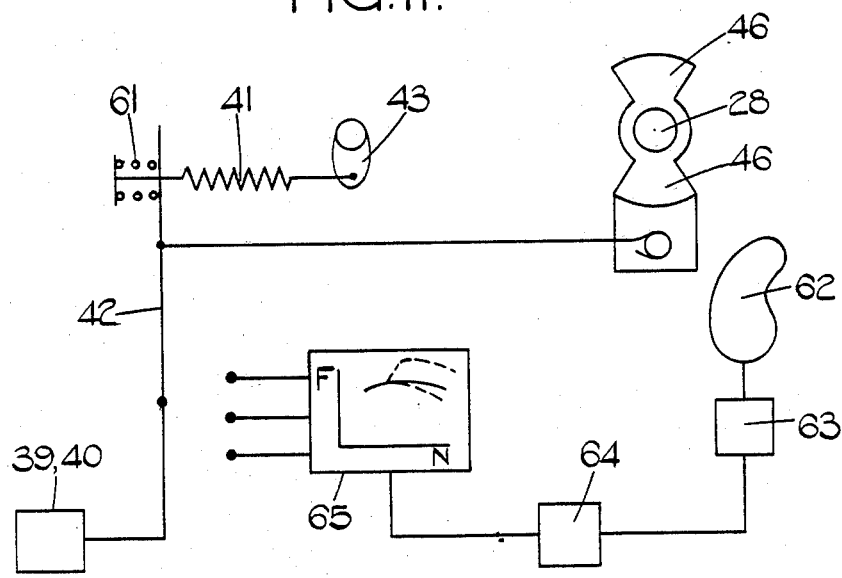

In the accompanying drawings,

FIG. 1 is a sectional side elevation of one form of a pumping apparatus to which the invention may be applied, FIG. 2 is a graph showing the characteristic of one part of the apparatus of FIG. 1, FIG. 3 is a curve showing a desired relationship between an output signal and a flow level, FIG. 4 is a plan view of part of the apparatus of FIG. 1 in accordance with the invention, FIG. 5 is a view of the part seen in FIG. 4 modified to provide the output characteristic of FIG. 3, FIG. 6 is a block diagram of a control circuit for use with the apparatus of FIG. 1, FIG. 7 shows part of the fluid pressure circuit for the apparatus of FIG. 1, FIG. 8 shows a modification to the fluid pressure circuit, FIG. 9 shows a modification of the control circuit, FIG. 10 shows a further modification of the fluid pressure circuit, FIG. 11 shows a further modification of the control circuit, and FIG. 12 shows a diagrammatic arrangement of part of the apparatus incorporating a stop.

Referring to FIG. 1 of the drawings, the known form of apparatus comprises a two part housing 9, 10. The housing part 9 is provided with an open end in which is located the part 10 of the housing.

Formed within the part 10 of the housing is a bore in which is mounted a rotary cylindrical distributor member 11, and this is coupled to an input shaft 12 which is located in the part 9 of the housing. The shaft 12 is adapted to be driven in timed relationship with an engine with which the apparatus is associated. Formed within the distributor member is a transverse bore 14 in which is mounted a pair of reciprocable plungers 15 and which are arranged to be moved inwardly as the distributor rotates, through the intermediary of a pair of rollers 16 respectively, by cam lobes not shown formed on an annular cam ring 17 mounted for angular movement within the part 9 of the housing. The surface of the bore in the housing constitutes a bearing surface for the cam ring.

Also formed in the distributor member 11 is a longitudinally extending passage 18 which at one end is in communication with the transverse bore and at its other end is in communication with a radially disposed delivery passage 19. The delivery passage 19 is arranged to register in turn with a plurality of equi-angularly spaced delivery ports, constituted as shown in the drawing, by passages 20. These are formed in the part 10 of the housing and in use are connected by pipe lines respectively to injection nozzles mounted on the associated engine. The aforesaid registration of the passage 19 with one of the delivery ports takes place during the whole time the plungers 15 are being moved inwardly so that liquid fuel contained within the transverse bore 14 will be displaced to a combustion space of the engine.

At another point the longitudinal passage 18 is in communication with a plurality of equi-angularly spaced and radially disposed inlet passages 22 which are arranged to register in turn with an inlet port 23 formed in the part 10 of the housing. The inlet port 23 is in communication with a control port 25 by way of a passage 24 and the control port is in communication with the outlet 26 of a fuel supply pump 27. The control port 25 and the valve member 28 constitute an adjustable throttle.

The effective size of the control port 25 can be varied by varying the angular setting of a valve member 28 which has a groove formed therein, and the arrangement is such that when an inlet passage 22 registers with the inlet port 23 fuel will flow from the outlet of the feed pump to the transverse bore 14 to move the plungers 15 outwardly. The aforesaid registration takes place only during the time when the delivery passage 19 is out of register with a passage 20 and during the time when the rollers 16 are clear of the cam lobes. By adjusting the setting of the valve member 28, the rate at which fuel can flow to the bore 14 can be controlled and hence also the amount of fuel delivered to the engine is controlled.

The feed pump 27 is provided with an inlet which is in communication with an inlet port 30 formed in a hollow part 37 which is secured to the part 10 of the housing. The inlet communicates with the inlet port 30 by way of a passage 29 also formed in the hollow part 37. The part 37 has mounted therein a tubular filter element 32 and a relief valve which includes a spring loaded element 33. One end of the element 33 is exposed to the pressure of fuel delivered by the feed pump and controls the size of a spill port 34 and the arrangement is such that the feed pump always pumps more fuel than is delivered to the engine with the result that the output pressure of the feed pump is controlled in a manner which is dependent upon the speed of the engine and which increases with the speed thereof.

As previously mentioned, the cam ring 17 is angularly adjustable so that the timing of delivery of fuel to the engine can be varied. This adjustment is achieved by a spring loaded piston 35 mounted in a cylinder 36. The piston is connected to the cam ring by means of a pin or peg 37a which is in screw thread engagement with the cam ring. Fuel is supplied to one end of the cylinder 36 to move the piston in opposition to its spring from the outlet 26 of the feed pump. The control of the pressure applied to the piston 35 will be discussed later.

Conveniently, the cylinder 36 is formed in a body 8 which is secured to the first housing part 9 by means of a pair of bolts 7, 6.

The angular setting of the valve member 28 is conveniently controlled by a mechanical governor which includes weights 39 which are accommodated in a cage driven by the shaft 12. The weights and cage are accommodated in the first housing part 9. The weights act upon an axially movable flanged collar 40 mounted about the drive shaft 12 and the axial movement of the collar is resisted by a governor spring 41 which is mounted between one end of a pivotal lever 42 and an operator adjustable member 43. The other end of the lever 42 bears upon the collar 40. Furthermore, said one end of the lever 42 is connected by a tie rod 44 to the valve member 28 and the arrangement is such that as the speed of rotation of the engine rises, the collar 40 will be moved axially by the weights against the action of the governor spring and during this movement the member 28 will be moved angularly to reduce the quantity of fuel delivered to the engine.

The timing of fuel by the apparatus is determined by the pressure applied to the piston 35. This pressure must therefore be varied during operation of the engine, in accordance with the speed of the associated engine and the load on the engine in order to obtain the desired timing characteristic. An indication of the load on the engine is obtained by generating a signal representing the amount of fuel delivered to the engine at each delivery stroke. The setting of the throttle provides an indication of the amount of fuel delivered to the engine but unfortunately the setting of the throttle for a given amount of fuel, depends upon a number of factors which can be classed under two groups. The first of these is due to the design and manufacture of the throttle (manufacturing tolerances etc.,) and the second is due to factors external of the throttle, e.g. the output pressure of the supply pump, speed of the associated engine and the temperature of the fuel. As the output pressure of the supply pump increases then for a given setting of the throttle, more fuel will flow through it in a given time and conversely as the time decreases as the speed of the associated engine increases, less fuel will flow through it. The temperature of the fuel is also important since it influences the viscosity of the fuel and if the fuel is cold it will be more viscous so that a reduced quantity of fuel will flow through the throttle.

It is proposed to take the second group of factors into account in an electronic control circuit and whilst it would also be possible to take the first group of factors into account in the control circuit, this would require that each apparatus should have its own calibrated electronic control circuit. This would raise problems when servicing the apparatus since it would be necessary if replacement of either the apparatus or the control circuit was required, to replace the control circuit and the apparatus respectively.

The curve shown in FIG. 2 represents the flow through the throttle as its angular setting is varied for a given pressure upstream of the throttle. FIG. 3 shows the required relationship between the signal from a transducer 45A associated with the throttle as compared with the flow through the throttle. In FIG. 4 the valve member 28 constituting the throttle is fitted with an armature 45 which is formed from ferrous material and which has wing portions 46. The armature moves angularly with the throttle between a pair of pole pieces 47 each of which mounts a winding, the windings being connected in series. As the wing portions move into alignment with the pole pieces, the inductance of the windings increases. Unfortunately the curve obtained is not truly linear but an intermediate portion of the curve is sufficiently linear for the transducer to be used in the situation. Due to manufacturing tolerances, variations will occur in the size of the port 24 and the port or groove 25 in the valve member 28, and it is proposed to assemble these two components and to measure the flow at different angular settings of the valve member with a constant pressure upstream. With this information it is proposed to modify the outer surfaces of the wings 46 as shown in FIG. 5 so that the manufacturing tolerances of the throttle member and also inaccuracies in the transducer, are taken care of. The result is a relationship as illustrated in FIG. 3. This calibration must take place for each apparatus.

Turning now to FIG. 6, this shows a block circuit diagram of one example of the electronic circuit. The signal from the transducer 45A of the throttle is supplied as a first signal, to a circuit 47. Also supplied to the circuit 47 is a second signal representing the speed of the apparatus and a third signal representing the output pressure of the supply pump. The circuit 47 from the signals supplied to it provides a fourth signal as an output, the fourth signal representing the amount of fuel supplied by the apparatus to the engine. The circuit 47 can calculate the fourth signal or it may take the form of a "fuel map" and therefore contain stored information from which the fourth signal can be determined by inspection. If it is required to take the viscosity of the fuel into account, the temperature of the fuel will be supplied to the circuit 47 at a further input.

The fourth signal is supplied to a further circuit 48 which provides a fifth signal at its output, the fifth signal representing the desired position of the cam ring 17. In order to determine this signal the circuit 48 is provided with a signal representing the speed of the apparatus, and other engine operating parameters such for example as the temperature of the engine and the pressure of air in the air inlet manifold. Like the circuit 47, the circuit 48 can calculate the fifth signal or it may be in the form of a "timing map" again containing stored information.

The fifth signal is supplied to an error amplifier 49 the output of which controls an actuator 50 which controls the setting of a valve which determines the pressure applied to the piston 35 which is shown diagrammatically. Also associated with the piston 35 is a transducer 51 which provides a feedback signal to the error amplifier 49. The arrangement is such that the error amplifier causes the actuator to adjust the pressure applied to the piston until the actual piston position as indicated by the transducer 51 corresponds to the desired piston position as indicated by the fifth signal obtained from the circuit 48. As an optional feature, the error amplifier 49 may be provided with a signal representing the engine position and this will enable the control circuit to take into account any discrepancies in the adjustment of the apparatus relative to the engine. The electronic circuit as described therefore takes into account the second group of factors mentioned above, and it enables any apparatus providing it has been properly calibrated, to be associated with any control circuit.

In FIG. 7, there is shown the fluid circuit and it will be seen that the actuator 50 comprises a variable restrictor to which fuel is supplied from the output of the low pressure supply pump and which is connected to the cylinder 36 by way of a ball check valve 52. The cylinder is also connected by way of a fixed restrictor 53 to a low pressure drain conveniently the interior of the apparatus. The purpose of the check valve 52 is to prevent so far as is possible, the reaction between the rollers and the cam ring effecting movement of the piston 35.

The electronic circuit described in FIG. 6 requires a signal indicative of the output pressure of the supply pump and this means a further transducer to be mounted on the apparatus. The signal provided by the position transducer 51 is in effect a signal which represents the pressure in the cylinder 36 and if as shown in FIG. 8, the supply to the throttle is taken from intermediate the check valve 52 and the actuator 50, the transducer 51 will provide a measure of the pressure upstream of the throttle. As shown in FIG. 9 therefore the signal from the transducer 51 can be supplied as the third signal to the circuit 47. It is necessary however to include a circuit 54 which modifies the signal from the transducer 51 so that a true pressure signal is applied to the circuit 47. The circuit 54 can be omitted and preferably is omitted in order to provide the inter-changeability feature mentioned earlier, by calibration of the transducer 51 in association with the spring which biasses the piston 35.

With both the examples described and as shown in FIG. 10, it is possible to omit the fixed restrictor 53 providing the supply of fuel to the throttle valve is taken from downstream of the ball check valve 52. This arrangement is particularly advantageous with the arrangement shown in FIGS. 8 and 9 where the transducer 51 provides the signal representative of the pressure of fuel supplied to the throttle. It is however useful with the arrangement shown in FIGS. 6 and 7.

The reason why it is possible to utilise the arrangement shown in FIG. 10 is that during operation of the apparatus, the reaction of the rollers and cam ring occurs when the port 23 is out of communication with a passage 22 and with the ball check valve 52 closed, an hydraulic lock is created in the cylinder 36. In addition, if in use the throttle is suddenly opened fuel will tend to flow from the space 36 through the throttle 55, to the bore 14. This flow of fuel will occur immediately and will cause a retardation of the timing of delivery of fuel. Once the new position of the throttle has been sensed then the actuator 50 will operate to adjust the pressure in the cylinder 36. This arrangement however does provide rapid adjustment of the timing when the throttle valve 55 is opened. Similarly, when the engine is in operation and the throttle is closed there will be a temporary increase in the fuel pressure in the cylinder 36 to advance the timing of delivery of fuel.

Turning now to FIG. 11 a modified arrangement is provided which also incorporates a modification to the apparatus. The low pressure supply pump is indicated at 27 and its output is connected directly to the throttle indicated at 55 and by way of the ball check valve 52, to the cylinder 36 which contains the piston 35. The regulation valve which is indicated at 56, operates to control the output pressure of the supply pump and associated with it is an actuator 57. As with the examples of FIGS. 6 and 9, the circuit 47 receives the first signal from the throttle, a second signal representing the engine speed and a third signal representing the pressure of fuel which is supplied to the throttle. The output of the circuit 47 is the fourth signal but instead of being supplied to a "timing map" as in the examples of FIGS. 6 and 9, it is supplied to a circuit 58 along with a speed signal, to provide the fifth signal which in this case is a desired output pressure of the supply pump 27. The circuit 58 may calculate this pressure or as with the circuits 47 and 48, it may be a "fuel pressure map" in which is contained stored information.

The signal from the circuit 58 is supplied to an error amplifier 59 which receives a signal from a pressure transducer 60 and provides an output signal to control the actuator 57 of the regulating valve 56. FIG. 11 does not show any form of feedback between the piston 35 and the remainder of the circuit. It is possible however to provide feedback by sensing the position of the piston 35 to provide an indication of the output pressure of the supply pump 27. As with the previous examples, the supply of fuel to the throttle 55 may be taken from downstream of the ball check valve 52.

Turning now to FIG. 12 there is shown in diagrammatic form the governor portion of the apparatus shown in FIG. 1 but incorporating an idling spring 61 which is well known in the art, connected between the lever 42 and the spring 41. Also provided is an angularly adjustable maximum fuel stop 62 the position of which is determined by an actuator 63. The actuator receives power from an amplifier 64 which in turn receives a signal from a circuit 65. The circuit 65 determines by calculation or by reference to information stored in it, the maximum amount of fuel which can be supplied to the engine for a given engine speed and for this purpose it is supplied with a speed signal. Also it can be supplied with an altitude signal which as the altitude increases causes a reduction in the maximum fuel and in the case of a supercharged engine, with a signal indicative of the pressure in the air inlet manifold of the engine this with increasing pressure causing an increase in the amount of fuel supplied to the engine. The fuel stop 62 is positioned in accordance with the output signal from the circuit 65. The circuit 65 may also be provided with a signal representing the actual fuel level signal. The stop acts to limit the angular movement of the valve member 28.

We claim:

1. A fuel pumping apparatus for supplying fuel to an internal combustion engine comprising an injection pump operable in use in timed relationship with an associated engine, fluid pressure operable means for adjusting the timing of delivery of fuel by the apparatus comprising a member against a surface of which fluid under pressure can act, and resilient means opposing the movement of the member by said fluid pressure, a low pressure fuel supply pump for supplying fuel to the injection pump, an adjustable throttle for varying the quantity of fuel supplied to the injection pump, a transducer associated with the throttle valve for providing a first signal indicative of the effective flow area of the throttle valve throughout the range of movement thereof, an electrical circuit which receives said first signal, a second signal indicative of the speed of operation of the apparatus and a third signal indicative of the fuel pressure upstream of the metering valve and from which is determined a fourth signal representing the amount of fuel supplied to the injection pump, means responsive to at least said second and fourth signals for providing a fifth signal to vary the timing of delivery of fuel by the apparatus, an error amplifier to which said fifth signal is supplied, a further transducer for providing a sixth signal representative of the position of said fluid pressure operable means, said sixth signal being supplied to said error amplifier, an actuator responsive to the output of said error amplifier for controlling the pressure applied to said fluid pressure operable means, said actuator controlling the size of a restrictor through which fluid under pressure from a source is applied to said surface, said source of fluid pressure being said low pressure fuel supply pump and including a branch passage from downstream of said restrictor and through which fuel is supplied to the injection pump under the control of said throttle valve.

2. An apparatus according to claim 1 in which said electrical circuits and said means responsive to said second and fourth signals contain stored information from which said fourth and fifth signals respectively can be derived in response to the input signals thereto.

3. An apparatus according to claim 1 including a ball check valve disposed intermediate said surface and the restrictor.

4. An apparatus according to claim 3 in which said branch passage is disposed upstream of said ball check valve.

* * * * *